United States Patent [19]

Yokomizo et al.

[11] Patent Number: 5,074,048

[45] Date of Patent: Dec. 24, 1991

[54] APPARATUS FOR MEASURING WHEEL RIM DISPLACEMENTS

[75] Inventors: Shoziro Yokomizo; Takeshi Saitoh, both of Yokohama; Yutaka Yanamoto; Kenji Yamagishi, both of Ayase, all of Japan

[73] Assignee: Topy Kogyo Kabushiki Kaisha, Tokyo, Japan

[21] Appl. No.: 549,427

[22] Filed: Jul. 6, 1990

[30] Foreign Application Priority Data

Jul. 7, 1989 [JP] Japan .................................. 1-173932

[51] Int. Cl.$^5$ ............................ G01B 5/20; G01B 7/28
[52] U.S. Cl. ................................ 33/203.13; 33/203.18; 33/203.19
[58] Field of Search ................ 33/203, 203.11, 203.12, 33/203.18, , 203.19, 203.2, 203.21, 203.15, 203.16, 203.17, DIG. 21, 504, 710, 712

[56] References Cited

U.S. PATENT DOCUMENTS

| 2,189,394 | 2/1940 | Fried | 33/203.19 |
| 2,613,447 | 10/1952 | Brouwer | 33/203.16 |
| 4,129,950 | 12/1978 | Weinhaus et al. | 33/203.19 |
| 4,151,655 | 5/1979 | Makarainen | 33/203.18 |
| 4,389,787 | 6/1983 | Solaroli | 33/504 |
| 4,802,285 | 2/1989 | Ligacz et al. | 33/203.11 |

FOREIGN PATENT DOCUMENTS

| 217712 | 9/1986 | Japan | 33/203 |
| 217713 | 9/1986 | Japan | 33/203 |
| 0173911 | 7/1988 | Japan | 33/712 |
| 241302 | 10/1988 | Japan | 33/203 |
| 31106 | 2/1990 | Japan | 33/203 |

Primary Examiner—William A. Cuchlinski, Jr.
Assistant Examiner—C. W. Fulton
Attorney, Agent, or Firm—Cushman, Darby & Cushman

[57] ABSTRACT

A wheel rim displacement measuring apparatus which measures radial and axial displacements of a rim wall on the basis of a nut seat pitch circle. A wheel to be measured is mounted on a lower head on the basis of a hub hole center and rotated about an axis of the lower head. An upper spindle which is horizontally displaceable relative to the lower head is adjusted in position so as to align with a nut seat pitch circle center of the wheel and is rotated about the axis of the lower head. A Fourier analysis is carried on a wave of the displacements of the upper spindle so that an eccentricity amount of the nut seat pitch circle center from the hub hole center of the wheel can be calculated from the first harmonic. In a computer, a wave of the displacements of the rim wall measured on the basis of the hub hole center is amended in calculation to a wave of the displacements of the rim wall from a true circle having a center at the nut seat pitch circle using the first harmonic wave.

8 Claims, 11 Drawing Sheets

FIG. 14 PRIOR ART ns of a rim of a
APPARATUS FOR MEASURING WHEEL RIM DISPLACEMENTS

BACKGROUND OF THE INVENTION

1. Field of the Invention

The present invention relates to an apparatus for measuring radial and axial displacements of a rim of a disk wheel.

2. Description of the Prior Art

Figure 12:
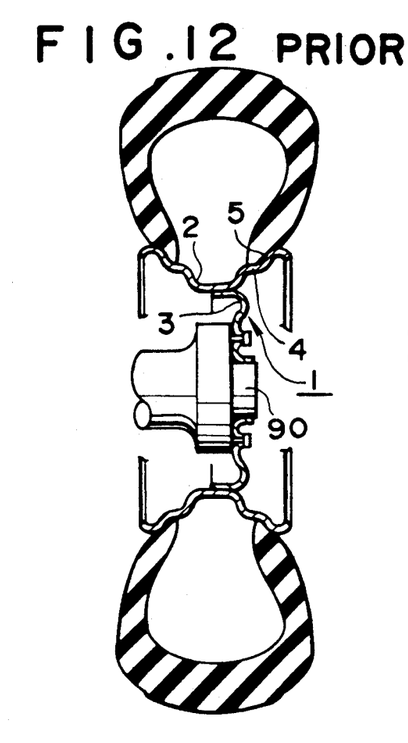
FIG. 12 is a sectional view of a conventional structure for securing a wheel to an axle shaft.
Figure 13:
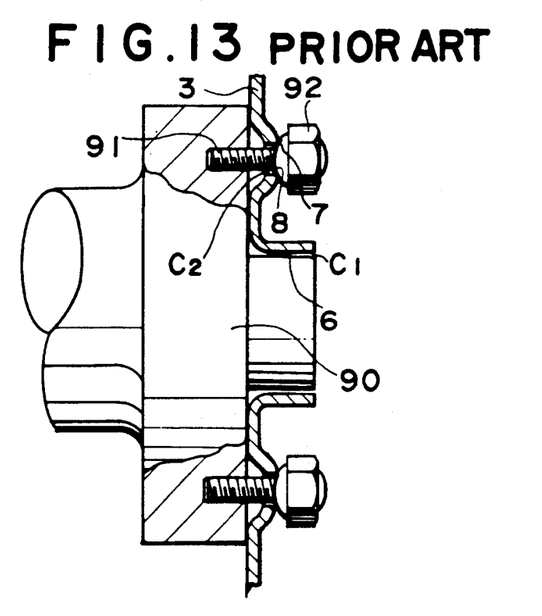
FIG. 13 is an enlarged, sectional view of one portion of the structure of FIG. 12.

As illustrated in FIG. 12, a disk wheel 1 includes a rim 2 and a disk 3. Rim 2 includes a bead seat portion 4 which contacts a tire bead in a radial direction and a flange portion 5 which contacts the tire bead in an axial direction. As illustrated in FIG. 13, disk 3 includes a hub hole 6 at a center of the disk and a plurality of nut holes 8 around hub hole 6. A nut seat 7 is formed at a surface of a portion of the disk defining an outboard end of each nut hole 8 and is tapered. Wheel 1 is secured to an axle shaft 90 of a vehicle by causing a hub bolt 91 fixed to axle shaft 90 to penetrate nut hole 8 and then causing hub nut 92 to screw-engage hub bolt 91. Nut seat 7 contacts a semispherical portion of a head of hub nut 92, whereby wheel 1 is positioned relative to axle shaft 90. In this structure, a clearance cl exists between a surface of hub hole 6 and a outside surface of a portion of axle shaft 90 penetrating hub hole 6, and a clearance c2 exists between an outer surface of hub bolt 91 and a surface of nut hole 8.

In FIG. 12, a radial displacement of an outer surface of bead seat 4 from a true circle having a center at an axle shaft axis and an axial displacement of an inboard surface of flange 5 from a plane perpendicular to the axle shaft axis are required to be less than respective allowable limits to obtain a good drive feeling. Since a rim is manufactured through the steps of rounding a flat plate, welding both ends of the rounded plate to form a cylindrical element, flaring opposite end portions of the cylindrical element, forming the flared cylindrical element into a rim element having a rough rim contour, and shaping the rim element to a rim element having an exact rim contour using an expander and/or shrinker, various kinds of distortions and strains remain in the exactly shaped rim. Therefore, measurement of radial and axial displacements of the rim and a judgment regarding whether or not the measured displacements are within allowable limits should be carried out at a final stage of a wheel manufacturing process.

Figure 14:
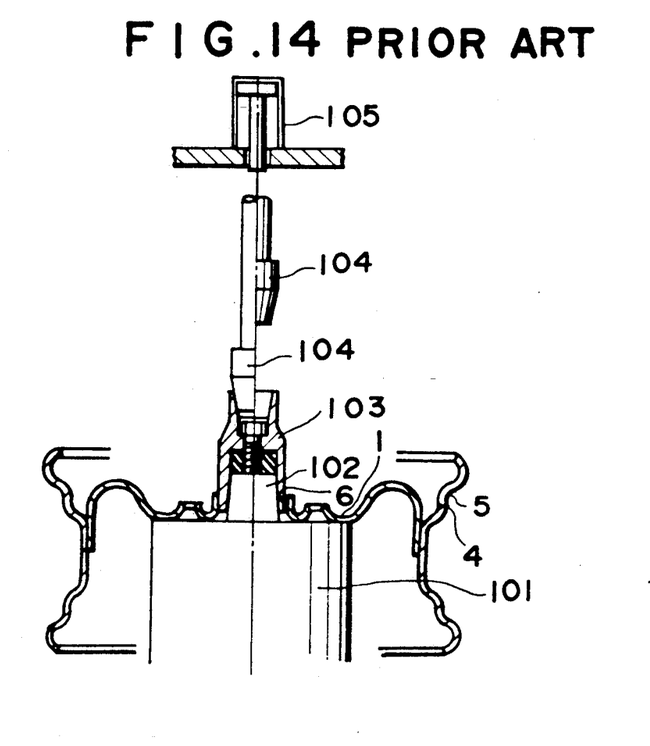
FIG. 14 is a sectional view of a conventional wheel rim displacement measuring apparatus.

According to a prior art apparatus for measuring wheel rim displacements, as illustrated in FIG. 14, a wheel 1 to be measured is mounted on a turn table 101. Then, a spindle 104 placed above turn table 101 is lowered by a cylinder 105 and pushes a collet chuck 103. When collet chuck 103 slidably engages a taper cone 102 fixed to turn table 101, collet chuck 103 is radially expanded and is pushed against a hub hole defining surface of wheel 1 whereby wheel 1 is secured to turn table 101. A radial displacement sensor (not shown) contacts a radially outer surface of bead seat 4 of wheel 1, and an axial displacement sensor (not shown) contacts an axially inboard surface of flange 5 of wheel 1. Then, wheel 1 is rotated by rotating turn table 101 and radial and axial displacements of the wheel rim are measured. In this measurement, displacements of the rim wall from a true circle having a center at a hub hole center are measured, because the wheel to be measured is secured to the turn table on the basis of the hub hole center. In this instance, if the hub hole center is misaligned from the turn table axis, the measurement results will contain errors caused by misalignment.

The above-described prior art measurement includes the following problems:

First, in mounting a wheel on a vehicle, since wheel 1 is positioned on the basis of nut seat 7 and secured to axle shaft 90, the center of hub hole 6 does not always coincide with the axis of axle shaft 90, though the center of the nut seat pitch circle coincides with the axis of axle shaft 90. More particularly, the center of hub hole 60 can be misaligned from the axis of axle shaft 90 within the limit of a clearance cl of FIG. 13. Therefore, measurement of displacements of a wheel rim from a true circle should be performed not on the basis of the center of the hub hole, but on the basis of the center of the nut seat pitch circle. For example, when a wheel, whose displacements measured on the basis of the hub hole center are within an allowable limit, is secured to an axle shaft, displacements measured on the basis of the nut seat pitch circle center may exceed the allowable limit because the displacements are added to the distance between the hub hole center and the nut seat pitch circle center.

Second, in order to develop an apparatus for measuring wheel rim displacements on the basis of a nut seat pitch circle center, the space above the turn table is preferably used as a space for placing a device for defining the nut seat pitch circle and the center of the circle. For this reason, it is not preferable to place the spindle 104 and the cylinder 105 for fixing the wheel in the space above turn table 101 as shown in FIG. 14. More particularly, the device for detachably securing wheel 1 to turn table 101 should be provided on the side of turn table 101 and such an apparatus is preferably developed.

Third, a detailed method for computing wheel rim displacements from a true circle having a center at a nut seat pitch circle center from various data which are measured on the basis of a hub hole center should be developed.

SUMMARY OF THE INVENTION

An object of the invention is to provide an apparatus for measuring wheel rim displacements which can measure radial and axial displacements of a wheel rim on the basis of a nut seat pitch circle center.

The above-described object can be attained by an apparatus for measuring radial and axial wheel rim displacements according to the present invention. The apparatus includes:

a lower head including a rotatable lower spindle for mounting a wheel thereon to be measured at a hub hole of the wheel;

an upper head positioned above the lower head so as to be vertically movable relative to the lower head, the upper head including a rotatable upper spindle horizontally displaceable relative to the lower spindle and detecting pins fitted to the upper spindle, the upper spindle including a portion with the contour of a true circle, the detecting pins being engageable with nut seats, each formed around an axis of each of nut holes, of a wheel to be measured when the upper head is lowered;

a nut seat pitch circle center displacement measuring unit including an upper spindle eccentricity measurement sensor pushed against a portion with the contour of a true circle of the upper spindle for detecting radial displacements of an outer surface of the portion with the contour of a true circle while the upper spindle rotates;

a rim wall displacement measuring unit including a stylus roller pushed against a radially outer surface of a rim bead seat portion and an axially inboard surface of a flange portion of a wheel to be measured, a radial displacement detecting sensor for sensing radial movements of the stylus roller and an axial displacement detecting sensor for sensing axial movements of the stylus roller while a wheel to be measured is rotated;

a drive unit including an electrical motor for rotating the lower spindle and a lower encoder for detecting phase angles of rotation of the lower spindle; and a computer for calculating radial and axial displacements of the rim wall of a wheel to be measured from a true circle having a center at a nut seat pitch circle center on the basis of the signals from the radial displacement detecting sensor, the axial displacement detecting sensor, the upper spindle eccentricity measurement sensor, and the lower encoder and determining whether the calculated radial and axial displacements are within allowable limits or not.

Using the above-described apparatus, displacements of a wheel rim are measured as follows:

First, a wheel to be measured is mounted on the lower head and is secured to the lower spindle at the hub hole of the wheel.

Then, the upper spindle of the upper head is lowered and the detecting pins are pushed against the nut seats of the wheel. During this pushing, the axis of the upper spindle automatically coincides with the center of the nut seat pitch circle in a horizontal direction, because the upper spindle is displaceable in the horizontal direction.

Then, the upper spindle eccentricity measurement sensor is pushed against the portion with the contour of a true circle of the upper spindle. Also, the stylus roller is pushed against the rim of the wheel.

Then, by operating the drive unit, the lower spindle of the lower head is rotated and thus, the wheel is rotated. The signals of the radial displacement detecting sensor, the axial displacement detecting sensor, the upper spindle eccentricity measurement sensor and the lower encoder are fed into the computer.

The computer calculates radial and axial displacements of the wheel rim from a true circle having its center at the nut seat pitch circle on the basis of the signals from the sensors and determines whether the calculated displacements are within the allowable limits or not.

BRIEF DESCRIPTION OF THE DRAWINGS

The above and other objects, features and advantages of the present invention will become more apparent and will be more readily appreciated from the following detailed description of the preferred exemplary embodiment of the invention taken in conjunction with the accompanying drawings in which.

DETAILED DESCRIPTION OF THE PREFERRED EMBODIMENT

Figure 1:
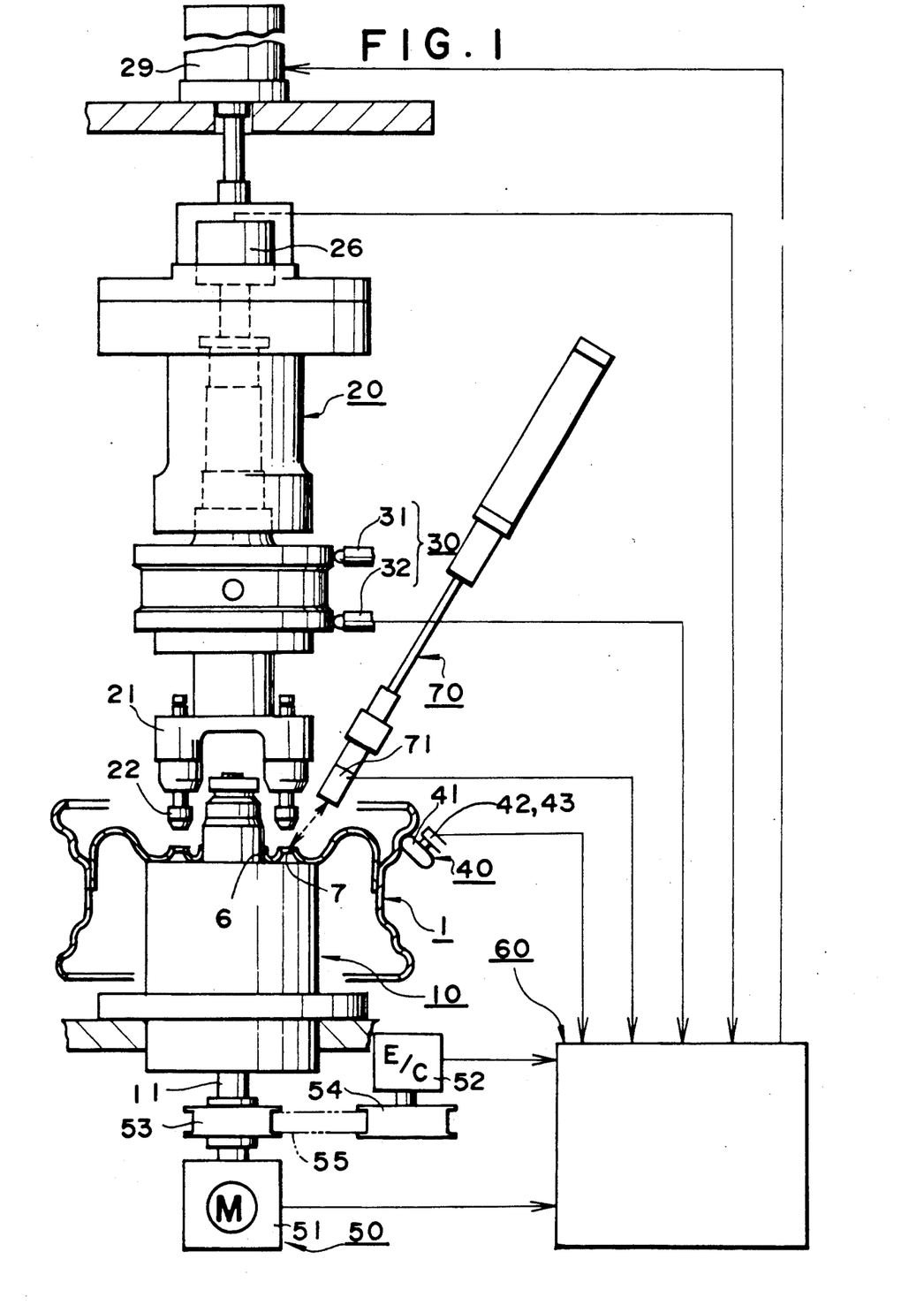
FIG. 1 is an elevational view of an apparatus for measuring wheel rim displacements in accordance with one embodiment of the present invention.

As illustrated in FIG. 1, an apparatus for measuring rim wall displacements of the present invention generally includes a lower head 10, an upper head 20, a nut seat pitch circle center displacement measuring unit 30, a rim wall displacement measuring unit 40, a drive unit 50, and a computer 60.

Figure 2:
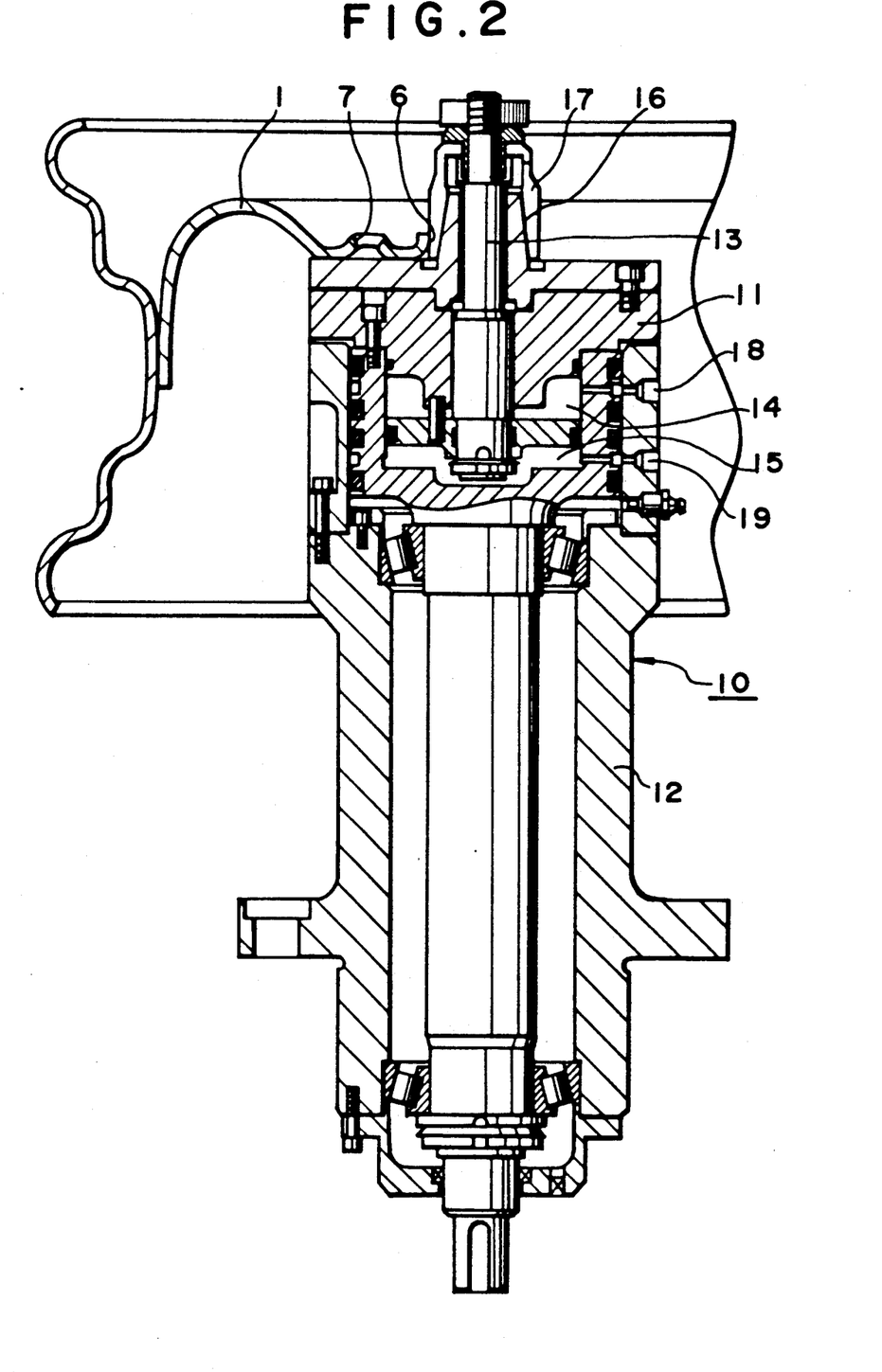
FIG. 2 is an enlarged, sectional view of a lower head of the apparatus of FIG. 1.

As illustrated in FIG. 2, lower head 10 includes a rotatable lower spindle 11. A wheel 1 to be measured is mounted on lower head 10 and is secured to lower spindle 11 at an inner surface of a hub hole 6 of a disk 3 of the wheel. Lower head 10 further includes a fixed lower housing 12 for rotatably supporting lower spindle 11, a piston/piston-rod assembly 13 supported vertically movably by lower spindle 11 and driven by a cylinder with upper and lower air chambers 14 and 15 formed in lower spindle 11, a taper cone 16 fixed to an upper portion of lower spindle 11, and a collet chuck 17 supported by an upper portion of piston/piston-rod assembly 13. Collet chuck 17 is axially slidable relative to taper cone 16 so as to be radially expanded or contracted. When compressed air is introduced into upper air chamber 14 through an air inlet 18, piston/piston-rod assembly 13 is lowered to push collet chuck 17 downward. When collet chuck 17 is lowered relative to taper cone 16, collet chuck 17 is radially expanded to clamp wheel 1 at hub hole 6. In contrast, when compressed air is introduced into lower chamber 15 through an air inlet 19, wheel 1 is unclamped. Since all the clamp/unclamp mechanisms are provided on the side of lower head 10, a space above lower head 10 can be used as a space for placing upper head 20.

Figure 3:
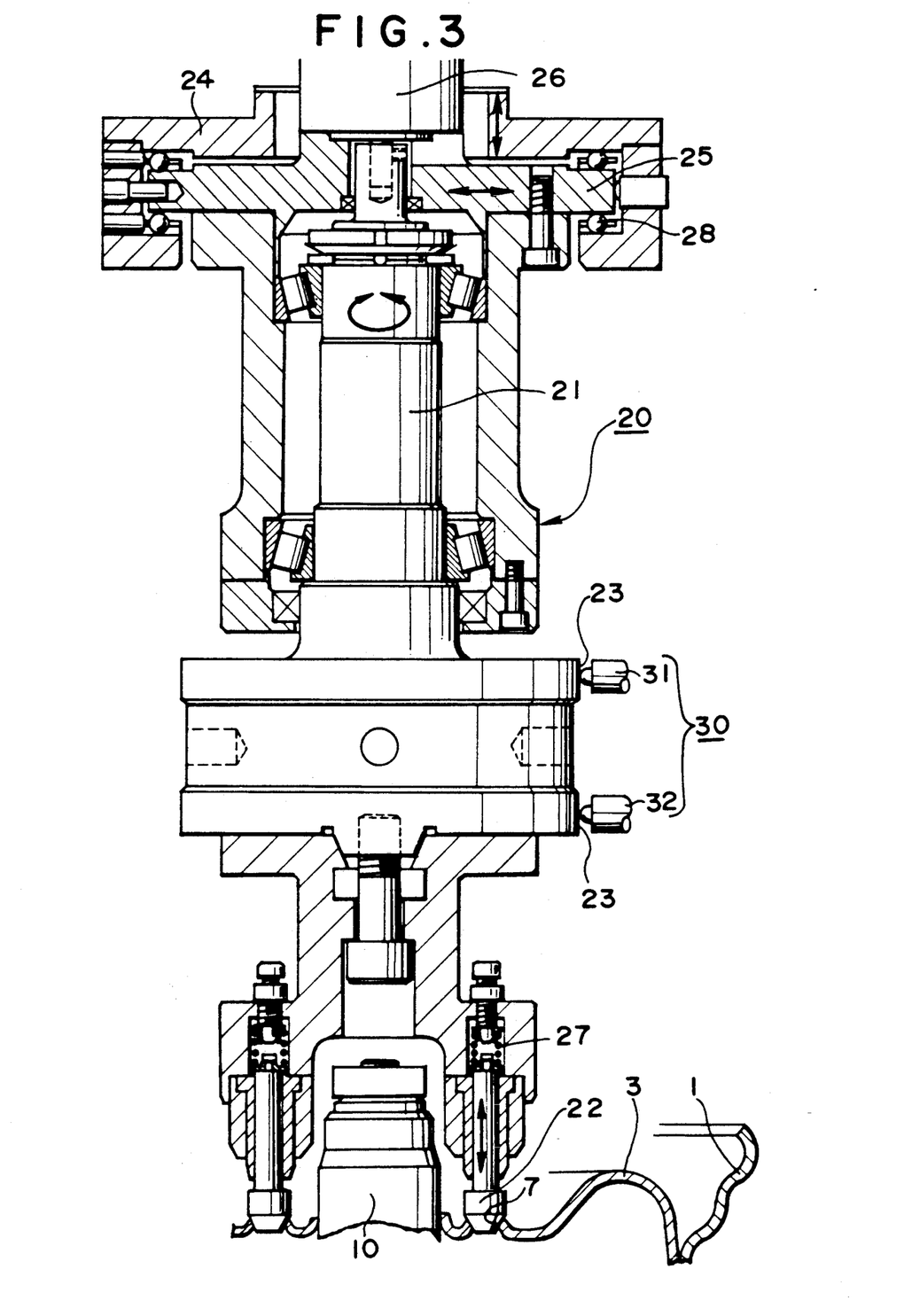
FIG. 3 is an enlarged, sectional view of a main portion of an upper head of the apparatus of FIG. 1.
Figure 4:
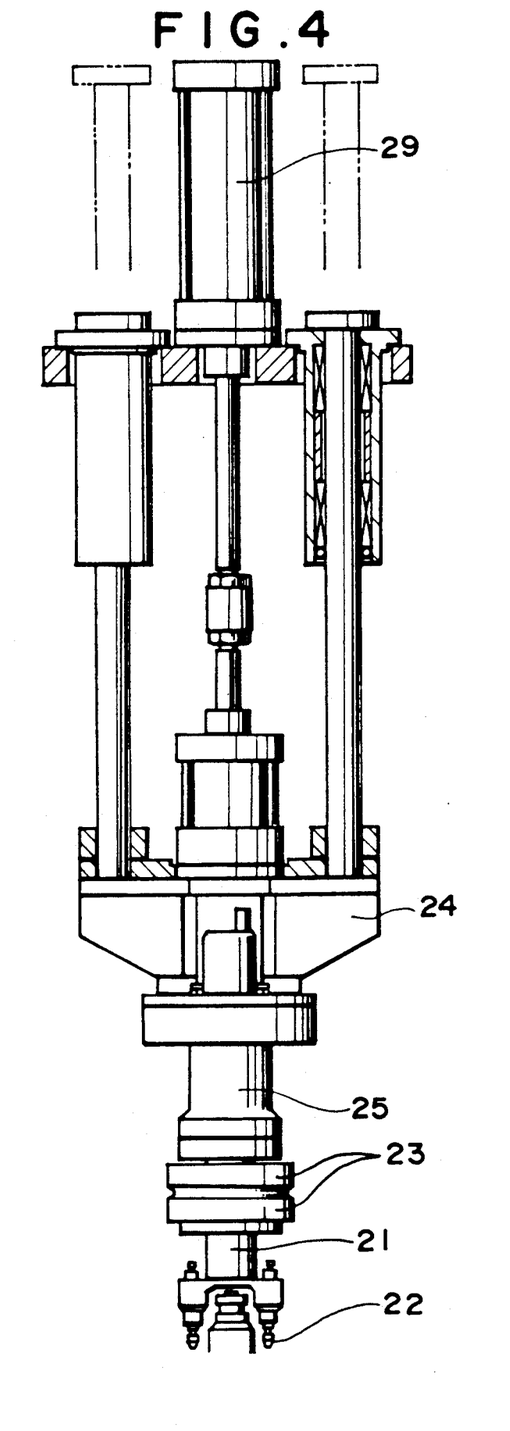
FIG. 4 is a sectional view of an entire portion of the upper head of the apparatus of FIG. 1.

As illustrated in FIG. 3, upper head 20 is provided above lower head 10 so as to be vertically movable. Upper head 20 includes an upper spindle 21 horizontally displaceable relative to lower head 10 (see FIG. 1). Upper head 20 further includes detecting pins 22 fitted to upper spindle 21 so that the pins 22 are vertically movable relative to upper spindle 21 and are energized downwardly by springs 27. Upper spindle 21 extends in a vertical direction and includes a portion with the contour of a true circle 23 which has a circle center at an axis of upper spindle 21. Upper head 20 further includes a vertically movable bracket 24, an upper housing 25, supported by bracket 24 so as to be horizontally displaceable relative to bracket 24, for rotatably supporting upper spindle 21, and an upper encoder 26, coupled to upper spindle 21, for detecting a phase angle of rotation of upper spindle 21. Balls 28 are inserted between upper housing 25 and upper bracket 24. Balls 28 allow upper housing 25 to horizontally move relative to upper bracket 24. Upper bracket 24 is moved in the vertical direction by means of a cylinder 29 shown in FIG. 4. When upper spindle 21 is lowered and detecting pins 22 are brought into engagement with nut seats 7 of disk 3 of wheel 1 to be measured, an axis of upper spindle 21 automatically coincides with a center of a nut seat pitch circle of wheel 1 because upper spindle 21 is horizontally displaceable due to balls 28. As a result, the axis of upper spindle 21 automatically aligns with the center of the nut seat pitch circle of wheel 1 to be measured which is secured to lower head 10. In this state, upper spindle 21 rotates about the axis of lower spindle 11 (see FIG. 1), when lower spindle 11 is rotated.

Figure 5:
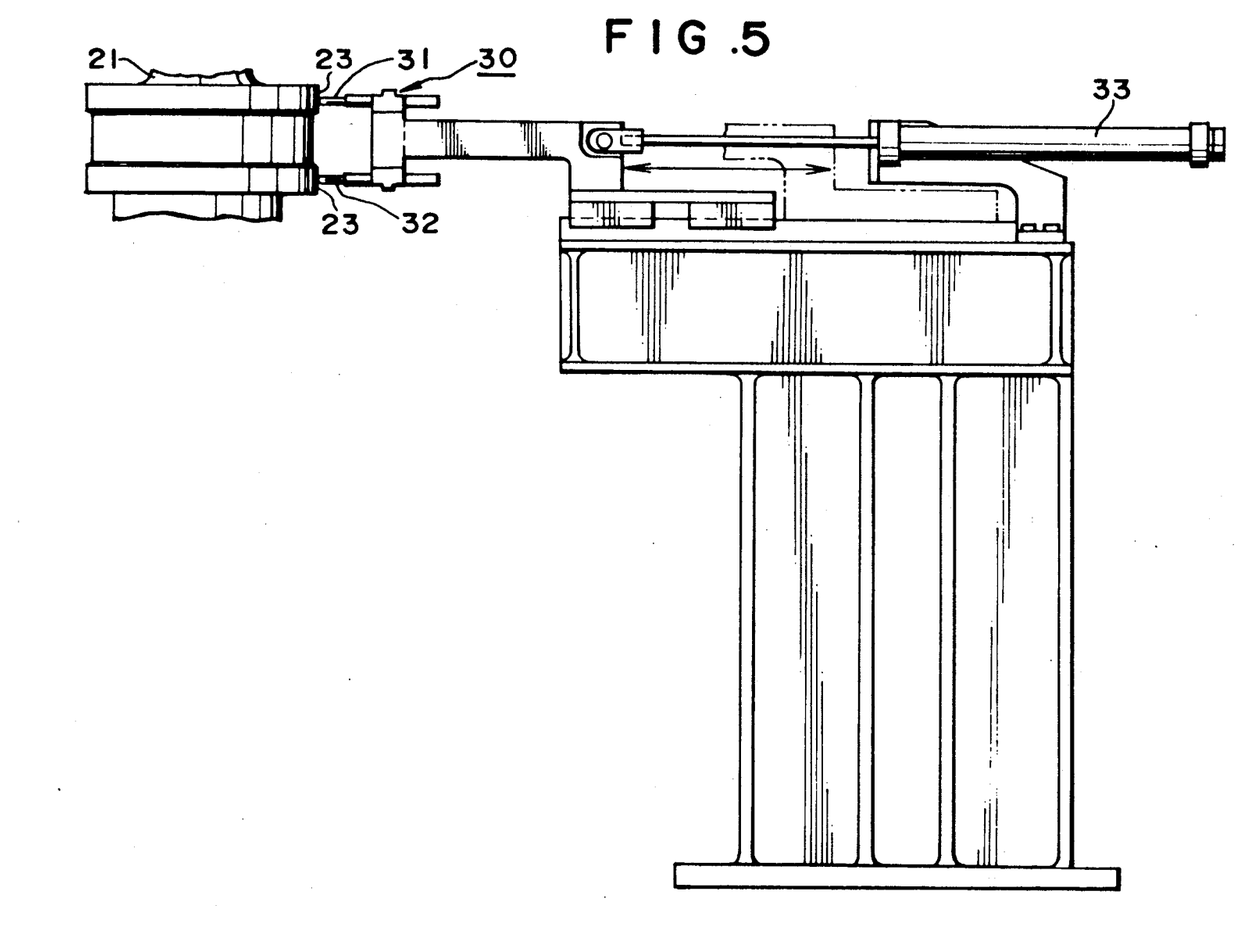
FIG. 5 is an elevational view of a nut seat pitch circle center displacement measuring unit of the apparatus of FIG. 1.

As illustrated in FIG. 5, nut seat pitch circle center displacement measuring unit 30 includes a pair of upper spindle eccentricity measurement sensors 31 and 32, pushed against the portion 23 with the contour of a true circle of upper spindle 21, for detecting radial displacements of an outer surface of the portion 23 with the contour of a true circle while upper spindle 21 is rotated about the axis of lower spindle 11. The sensors 31 and 32 are arranged in a single vertical plane and are vertically spaced from each other. This arrangement is needed to confirm that upper spindle 21 does not incline with respect to the vertical line. The sensors 31 and 32 are moved toward and away from the portion 23 with the contour of a true circle in the horizontal direction by means of an air cylinder 33.

Figure 6:
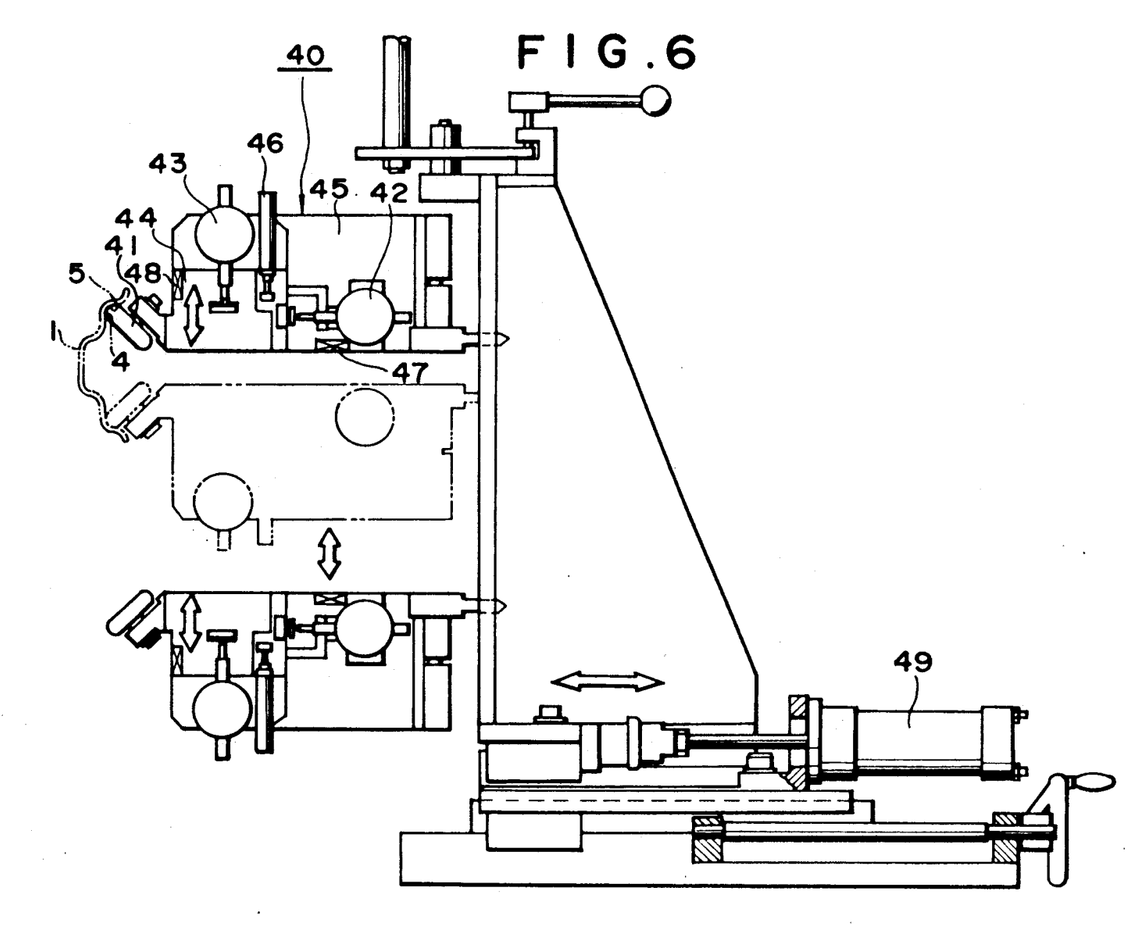
FIG. 6 is an elevational view of a rim wall displacement measuring unit of the apparatus of FIG. 1.

As illustrated in FIG. 6, rim wall displacement measuring unit 40 further includes a stylus roller 41 elastically pushed against a radially outer surface of a bead seat portion 4 of a rim 2 and an axially inboard surface of a flange portion 5 of the rim of a wheel 1 to be measured, a radial displacement detecting sensor 42 for sensing radial movements of stylus roller 41 and an axial displacement detecting sensor 43 for sensing axial movements of stylus roller 41 while wheel 1 to be measured is rotated. Rim wall displacement measuring unit 40 further includes a stylus roller supporting member 44 for rotatably supporting stylus roller 41 to which radial displacement detecting sensor 42 and axial displacement detecting sensor 43 are elastically pushed, a stylus roller bracket 45 slidably supporting stylus roller supporting member 44 in vertical and horizontal directions, a spring 47 horizontally energizing stylus roller supporting member 44 relative to stylus roller bracket 45 and toward bead seat portion 4 of wheel 1, a spring 48 vertically energizing stylus roller supporting member 44 relative to stylus roller bracket 45 toward flange portion 5 of wheel 1, and a bracket drive cylinder 46 for driving stylus roller bracket 45 in an axial direction of wheel 1 to be measured. Rim wall displacement measuring unit 40 further includes another bracket drive cylinder 49 for driving stylus roller bracket 45 in a radial direction of wheel 1 to be measured.

Since the stylus member pushed against the rim wall is constructed of not a ball but a roller in the present invention, a structure for supporting such a stylus member is simple. If the stylus member were a ball, a supporting structure of such a stylus ball would be very complicated and, as a result, means for detecting movements of such a stylus ball would be very difficult to design.

When stylus roller 41 is moved toward a rim wall, stylus roller 41 is moved by bracket drive cylinder 46 so as to be located on an inboard side of and apart from an inboard surface of flange 5, then stylus roller 41 is moved by another bracket drive cylinder 49 so as to be brought into contact with the outer surface of bead seat 4 of the rim wall, and then stylus roller 41 is moved by bracket drive cylinder 46 so as to finally contact the inboard surface of flange 5 of the rim wall.

As illustrated in FIG. 1, drive unit 50 includes a motor 51 coupled to lower spindle 11 so as to drive lower spindle 11, a lower encoder 52 for detecting a phase angle of rotation of lower spindle 11. Drive unit 50 further includes timing pulleys 53 and 54 and a timing belt 55 which cause lower spindle 11 and a shaft of encoder 52 to be related in rotation.

Figure 7:
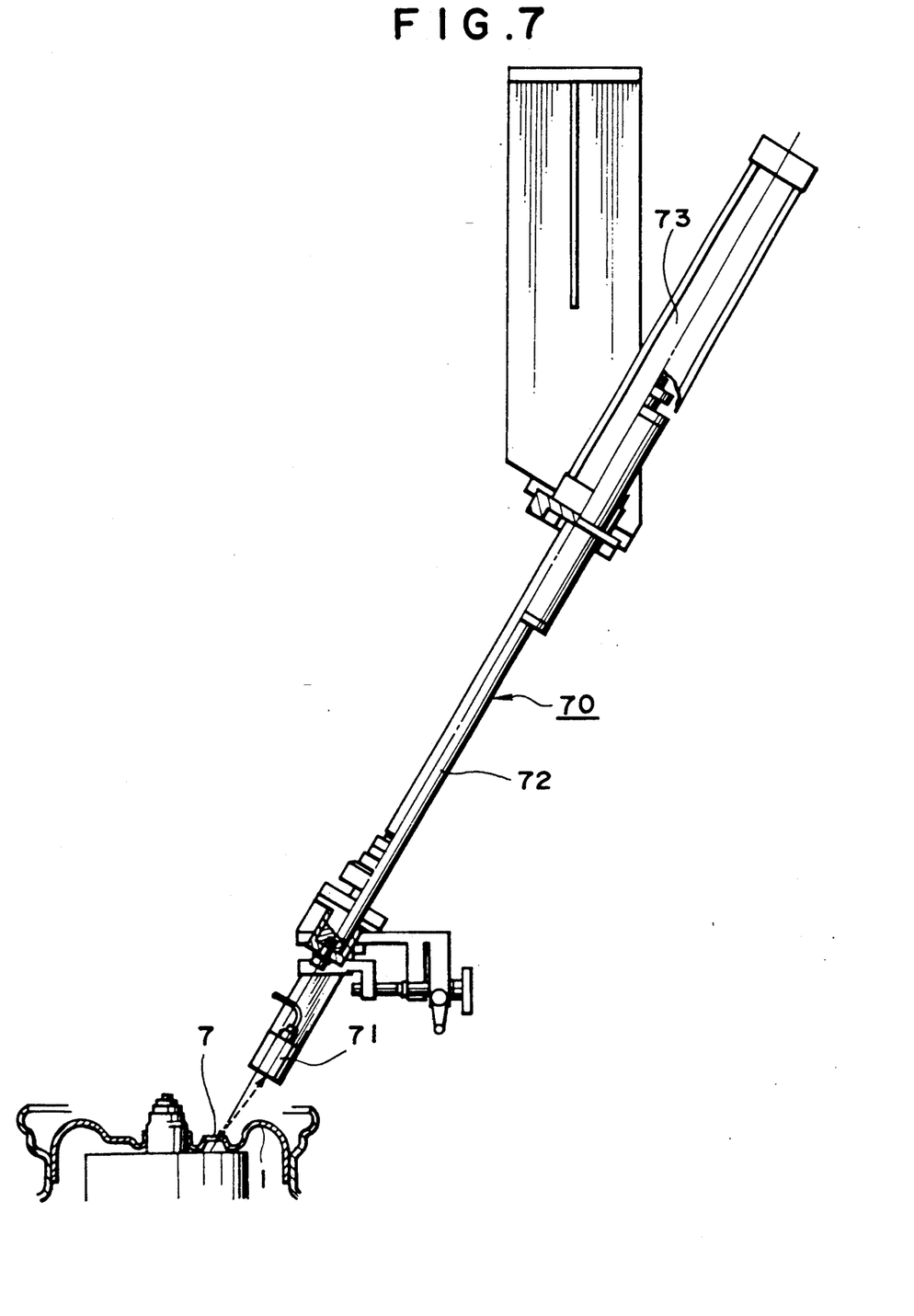
FIG. 7 is an elevational view of a nut seat position detecting apparatus of the apparatus of FIG. 1.

As illustrated in FIG. 7, wheel rim displacement measuring apparatus further includes a nut seat position detecting device 70. Nut seat position detecting device 70 is located on one side of upper head 20. Nut seat position detecting device 70 includes a rod 72 movable in the direction toward and away from the nut seat pitch circle of a wheel 1 to be measured, a cylinder 73 for driving rod 72 in an axial direction of the rod, and a laser sensor 71 coupled to a tip of rod 72. Laser sensor 71 issues a laser beam toward the nut seat pitch circle and receives the echo or reflected beam to thereby detect the position of the nut seat pitch circle during rotation of the wheel and send the signal to the input interface of the computer 60. This input is used for defining the wheel phase angle where the maximum of the wave occurs.

Figure 8:
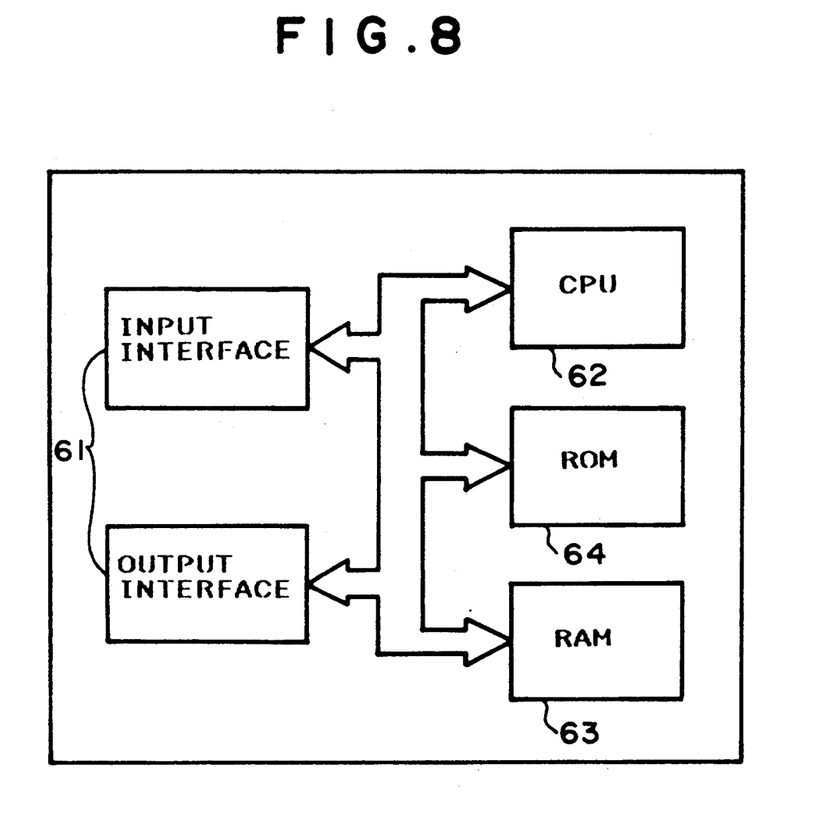
FIG. 8 is a block diagram of a computer of the apparatus of FIG. 1.

As illustrated in FIG. 8, computer 60 includes an input/output interface 61, a central processor unit (CPU) 62, a random access memory (RAM) 63, and a read only memory (ROM) 64. The input interface is electrically connected with radial displacement detecting sensor 42, axial displacement detecting sensor 43, upper spindle eccentricity measurement sensors 31 and 32, lower encoder 52, upper encoder 26, and nut seat detecting laser sensor 71. The signals from these sensors and encoders are fed into the computer through the input interface and are temporarily stored in RAM 63. ROM 64 stores a program for carrying out a Fourier analysis on an arbitrary wave and a program for calculating displacements of a rim wall of a wheel to be measured deviating from a true circle having its center at a center of a nut seat pitch circle and judging whether or not the calculated displacements are allowable or not. CPU 62 reads out these programs from ROM 64 and various data from RAM 63 and carries out the calculation.

Figure 9:
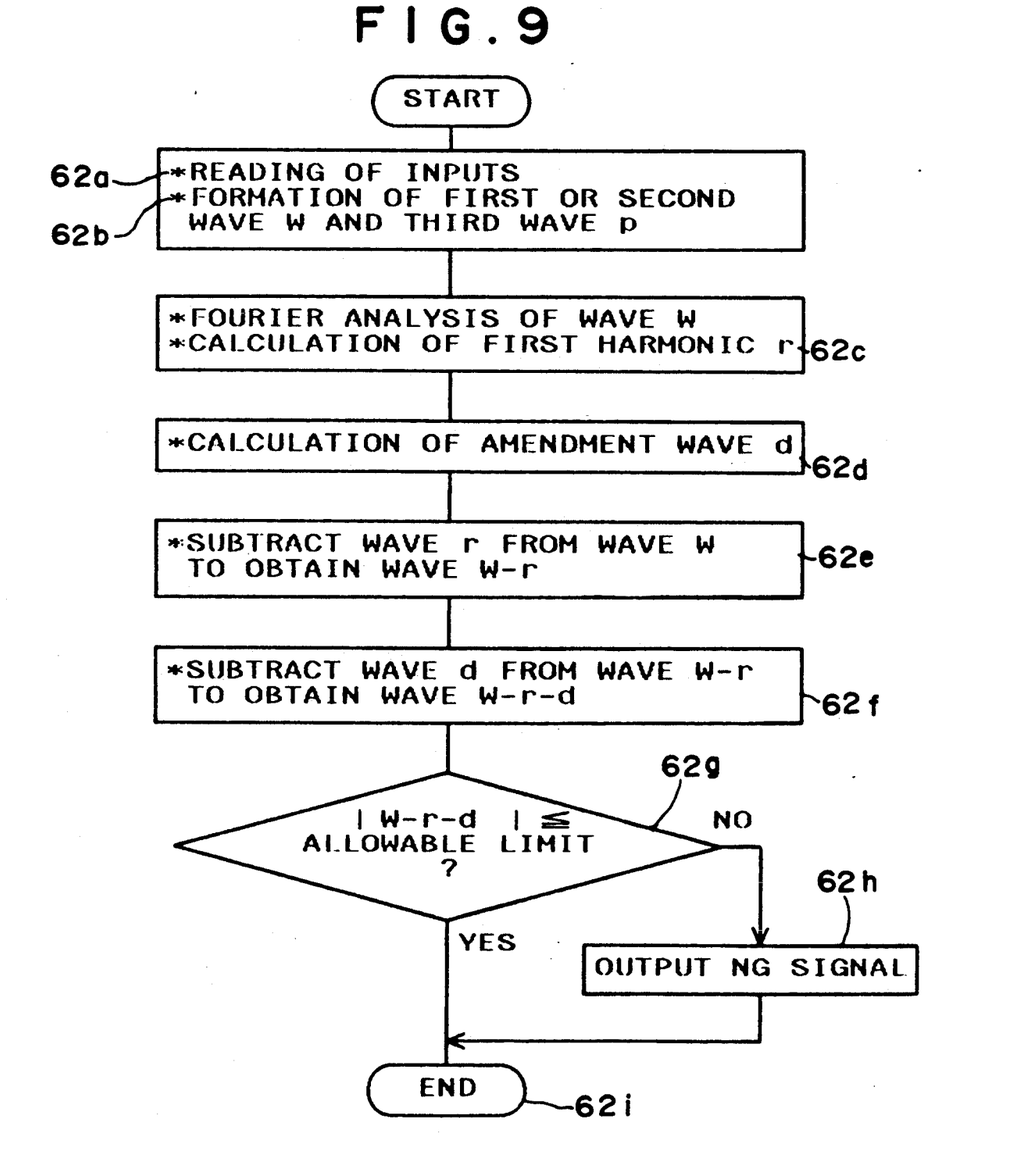
FIG. 9 is a flow chart stored in the computer of FIG. 8.

More particularly, as illustrated in FIG. 9, the program stored in ROM 64 and read out to CPU 62 includes five main steps or means for calculating wheel rim displacements on the basis of the nut seat pitch circle center and judging whether or not the calculated displacements are within an allowable limit.

Figure 10:
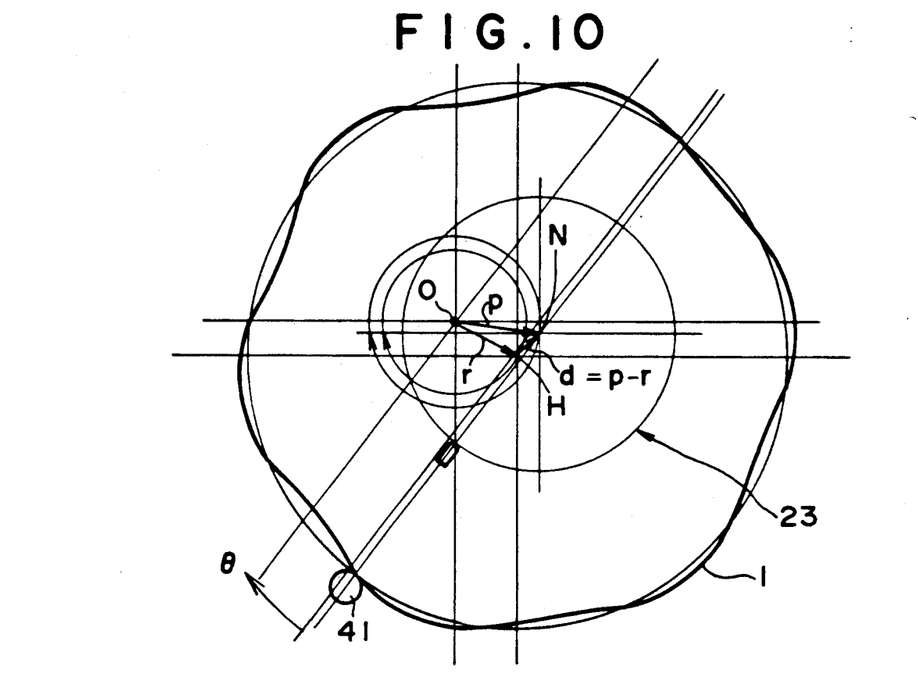
FIG. 10 is a diagram illustrating positional relationship among a wheel rim, a lower spindle axis, a hub hole center, a nut seat pitch circle center, and a portion with the contour of a true circle of an upper spindle.
Figure 11:
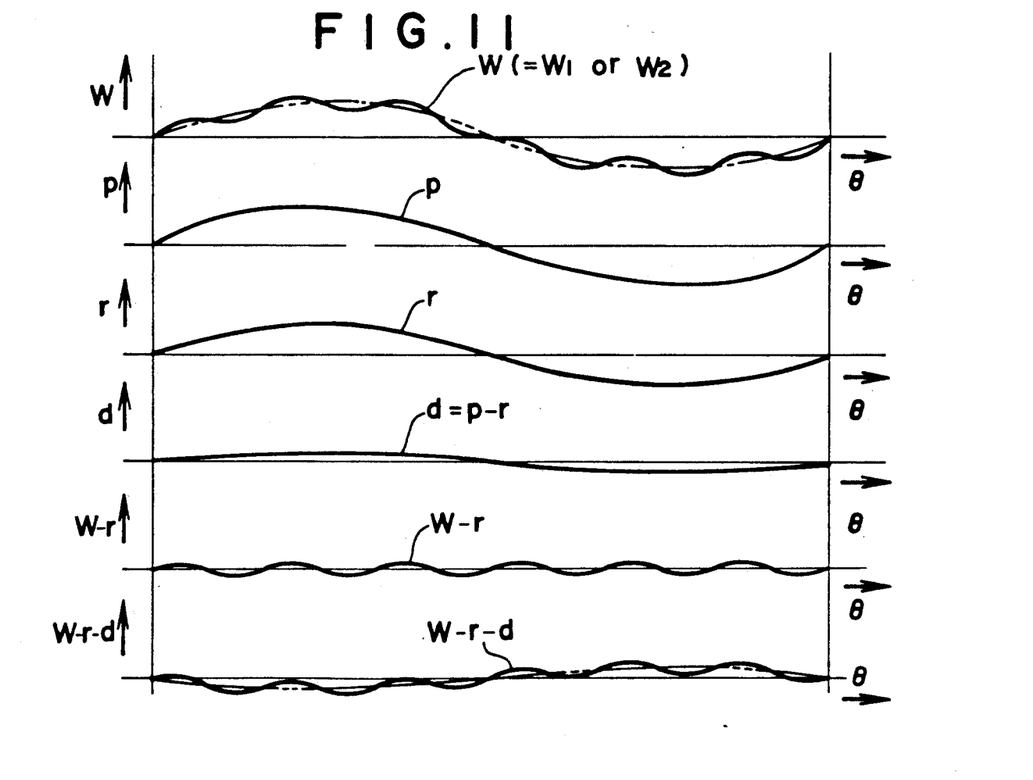
FIG. 11 is a graph illustrating various kinds of waves.

The calculation is carried out as follows:

At the first step including sub-steps 62a and 62b, the signals from lower encoder 52, radial displacement measuring sensor 42, axial displacement measuring sensor 43, and upper spindle eccentricity measurement sensors 31 and 32 are read. Then, on the basis of these data, a first wave W1, a second wave W2, and a third wave p are calculated and formed. In this instance, the first wave W1 is determined from radial displacements of the rim wall and the phase angle θ of the wheel (which is equal to the phase angle of lower spindle 11) when wheel 1 to be measured is rotated about the axis of lower spindle 11. Similarly, the second wave W2 is determined from axial displacements of the rim wall and the phase angle Γ of the wheel, and the third wave p is determined from radial displacements of the portion 23 with the contour of a true circle and the phase angle θ of the wheel. FIG. 11 illustrates wave p and a wave W which is equal to either one of the waves W1 and W2. Relationship between these waves will be explained in more detail with reference to FIG. 10. For example, suppose that the hub hole center H of wheel 1 is offset from the axis O of lower spindle 11 by a vector amount r, and the nut seat pitch circle center N is offset from the lower spindle axis O by a vector amount p, when wheel 1 to be measured is mounted on and secured to lower head 10. In this instance, the nut seat pitch circle center N is offset from the hub hole center H by a vector amount d (d=p−r). Since wheel 1 is secured to lower spindle 11 and therefore is rotated together with lower spindle 11 about the lower spindle axis O, the waves W1 and W2 of FIG. 11 illustrate displacements of the rim wall about the lower spindle axis O. Similarly, the wave p of FIG. 11 illustrates displacements of the outer surface of the portion 23 with the contour of a true circle about the lower spindle axis O.

At the second step 62c, each of the waves W1 and W2 is developed to a Fourier series using the program read from ROM 64. As a result, the wave W (equal to W1 or W2) is developed into the following form:

$$W = A0 + A1 \sin wt + A2 \sin 2wt + \ldots + An \sin nwt$$
$$+ B1 \cos wt + B2 \cos 2wt + \ldots + Bn \cos nwt$$

In the explanation below, A0 is deemed to be, for example, zero for easy understanding. From the first harmonic A1 sin wt and/or B1 cos wt, a wave r of FIG. 11 is formed. The wave r is caused from a misalignment with which the wheel 1 to be measured is secured to lower spindle 11 and therefore has no relation to actual displacements of the rim wall from the true circle having a center at the hub hole center H. The wave r is a wave caused by rotation of vector r when hub hole center H rotates about lower spindle axis O in FIG. 10.

At the third step 62d, the wave r of first harmonic is subtracted from the third wave p to form an amendment wave d, that is, d=p−r. The amendment wave d is a wave which nut seat pitch circle center N draws about hub hole center H while wheel 1 to be measured is rotated.

At the fourth step 62e, the first harmonic wave r is subtracted from each of the first wave W1 and the second wave W2. Then, the remaining harmonics (n=2,3, ...) of the first wave are again synthesized so that a radial displacement wave (W−r) of the rim wall deviating from the true circle having a center at hub hole center H is obtained, and similarly, the remaining harmonics of the second wave are again synthesized so that an axial displacement wave (W−r) of the rim wall deviating from the true circle having a center at hub hole center H is obtained. This wave (W−r) is shown in FIG. 11.

At the fifth step including sub-steps 62f, 62g, 62h, and 62i, the wave (W−r) of radial or axial displacements of the rim wall from a true circle having a center at hub hole center H is amended to a wave of displacements of the rim wall from a true circle having a center nut hole pitch circle center N. More particularly, the amendment wave d is subtracted from the wave (W−r) to form an amended wave (W−r−d) which is a wave of displacements of the rim wall from the true circle having a center at nut seat pitch circle center N. The amended wave is shown in FIG. 11 and is stored in RAM 63. At the sub-step 62g, whether the maximum of the wave (W−r−d) is within an allowable limit therefor or not is determined. If the maximum of the wave is within the allowable limit, the routine proceeds to the step 62i and ends there. Contrarily, if the maximum of the wave exceeds the allowable limit, the computer generates an NG signal. The pattern of the wave (W−r−d), the maximum of the wave, and the phase angle where the maximum of the wave occurs are stored in RAM 63.

A radially outer surface of a tire also has displacements from a true circle having a center at a tire center. Therefore, when a tire is mounted on a wheel, it is preferable that negative displacements of the tire and the positive displacements of the wheel should be combined with respect to each other in order that the combined displacements are small. The data stored in RAM 63 can be used for such a combination of a tire and a wheel.

Next, operation of the wheel rim displacement measuring apparatus will be explained.

A wheel 1, see FIG. 2, to be measured is mounted on lower head 10. Then, compressed air is introduced into upper air chamber 14 to thereby move piston/piston-rod assembly 13 downward. At the same time, collet chuck 17 is lowered and is slidably pushed against taper cone 16 so that collet chuck 17 is radially expanded to be pushed against the inner surface of hub hole 6 of wheel 1. As a result, wheel 1 is secured to lower spindle 11 and is positioned on the basis of hub hole 6. Under this state, wheel 1 is rotatable together with lower spindle 11 about the lower spindle axis O.

Then, upper head 20, see FIG. 3, is lowered, and detecting pins 22 are pushed against nut seats 6. Each detecting pin 22 has a tapered lower end portion where detecting pin 22 receives a horizontal force from the semi-spherical or tapered nut seat when detecting pin 22 is offset from the center of the nut seat. When detecting pin 22 receives a horizontal force, upper spindle 21 horizontally moves together with upper housing 25 relative to upper bracket 24. As a result, the axis of upper spindle 21 automatically coincides with the nut seat pitch circle center N. Under this state, upper spindle 21 is rotatable about the lower spindle axis O.

Upper spindle eccentricity measurement sensors 31 and 32 are pushed against the portion 23 with the contour of a true circle in the horizontal direction.

Also, stylus roller 41, see FIG. 6, is driven toward the rim wall by driving drive cylinder 46 and drive cylinder 49 and is brought into contact with the outer surface of the bead seat and the inboard surface of the flange of the wheel rim. Laser sensor 71, see FIG. 7, also is moved so as to be opposite to the nut seat pitch circle.

Then, lower spindle 11 is driven by motor 51 of drive unit 50 so that wheel 1 is rotated together with lower spindle 11. Radial displacement detecting sensor 42 and axial displacement detecting sensor 43 detect the radial displacements and axial displacements of the rim wall, respectively, while wheel 1 rotates by at least 360°. Also, upper spindle eccentricity measurement sensors 31 and 32 detect the radial displacements of the portion 23 with the contour of a true circle of upper spindle 23. The signals from the sensors 42 and 43, and 31 and 32 are fed into the computer so as to be temporarily stored in RAM 63, see FIG. 8. The signals from lower encoder 52, upper encoder 26 and laser sensor 71 also are stored in RAM 63.

Computer 60 computes the calculation according to the flow chart of FIG. 9, and finally calculates the radial displacements and axial displacements of the rim wall from the true circle having its center at the nut seat pitch circle center N, and a phase angle $\theta$ of wheel 1. Computer 60 further determines whether the calculated wheel rim displacements are within allowable limits therefor or not.

According to the present invention, radial and axial displacements of the wheel rim from the true circle having its center at the nut seat pitch circle center N can be obtained. This type of measurement will contribute to decreased vibration of a vehicle when taking into consideration that a wheel is mounted to a vehicle on the basis of the nut seat pitch circle.

Although only on embodiment of the present invention has been described in detail, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. An apparatus for measuring radial and axial wheel rim displacements comprising:
    a lower head including a rotatable lower spindle for mounting a wheel to be measured thereon and securing the wheel at a hub hole defining surface of the wheel;
    an upper head positioned above the power head so as to be vertically movable relative to the lower head, the upper head including a rotatable upper spindle horizontally displaceable relative to the lower spindle and detecting pins supported by the upper spindle, the upper spindle including a portion with the contour of a true circle, the detecting pins being engageable with nut seats formed around nut holes of the wheel to be measured when the upper head is lowered;
    a nut seat pitch circle center displacement measuring unit including an upper spindle eccentricity measurement sensor pushed against the portion with the contour of a true circle of the upper spindle for detecting radial displacements of an outer surface of the portion with the contour of a true circle while the upper spindle is rotated;
    a rim wall displacement measuring unit including a stylus roller pushed against a radially outer surface of a rim bead seat portion and an axially inboard surface of a flange portion of the wheel to be measured, a radial displacement detecting sensor for sensing radial movements of the stylus roller and an axial displacement detecting sensor for sensing axial movements of the stylus roller while the wheel to be measured is rotated;
    a drive unit including an electrical motor for rotating the lower spindle and a lower encoder for detecting a phase angle of rotation of the lower spindle; and
    a computer for calculating radial and axial displacements of a rim wall of the wheel to be measured from a true circle having a center at a center of the nut seat pitch circle on the basis of the signals from the radial displacement detecting sensor, the axial displacement detecting sensor, the upper spindle eccentricity measurement sensor, and the lower encoder and judging whether the calculated displacements are allowable or not.

2. The apparatus according to claim 1, wherein the lower head further includes:
    a lower housing for rotatably supporting the lower spindle;
    a piston/piston-rod assembly supported vertically movably by the lower spindle and driven by a cylinder formed in the lower spindle;
    a taper cone fixed to an upper portion of the lower spindle; and
    a collet chuck supported by an upper portion of the piston/piston-rod assembly, the collet chuck axially slidably engaging with the taper cone so that the collet chuck is expanded or contracted when the collet chuck is moved relative to the taper cone.

3. The apparatus according to claim 1, wherein the upper head further includes:
    a vertically movable bracket;
    an upper housing supported by the bracket so as to be horizontally displaceable relative to the bracket, the upper housing rotatably supporting the upper spindle; and
    an upper encoder, coupled to the upper spindle, for detecting a phase angle of the upper spindle.

4. The apparatus according to claim 1, wherein the nut seat pitch circle center displacement measuring unit includes the upper spindle eccentricity measurement sensor by two in number which are arranged vertically relative to each other and a cylinder for moving the two eccentricity measurement sensors toward and away from the portion with a true circle of the upper spindle in a horizontal direction.

5. The apparatus according to claim 1, wherein the rim wall displacement measuring unit further includes:
    a stylus roller supporting member for rotatably supporting the stylus roller, the stylus roller supporting member being contacted by the radial displacement detecting sensor and the axial displacement detecting sensor;
    a stylus roller bracket elastically supporting the stylus roller supporting member via a spring; and
    a bracket drive cylinder for driving the stylus roller bracket in an axial direction of the wheel to be measured.

6. The apparatus according to claim 1, wherein the computer includes:
    an input/output interface to which signals from the radial displacement detecting sensor, the axial displacement detecting sensor, the upper spindle eccentricity measurement sensor, and the lower encoder are fed;
    a read only memory storing a program able to carry out a Fourier analysis on an arbitrary form of wave;
    a central processor unit for calculating displacements of the rim wall of the wheel to be measured from a true circle having its center at the center of the nut seat pitch circle on the basis of the signals from the sensors and judging whether or not the calculated displacements are allowable; and a random access memory temporarily storing the signals from the sensors and calculation results calculated at the central processor unit.

7. The apparatus according to claim 6, wherein the computer further stores a program which includes:
a first step where on the basis of the signals fed into the computer from the axial displacement detecting sensor, the lower encoder, the radial displacement detecting sensor, and the upper spindle eccentricity measurement sensor while the wheel to be measured is rotated about an axis of the lower spindle, a first wave which is determined from the wheel rotational angles and the radial displacements, a second wave which is determined from the wheel rotational angles and the axial displacements, and a third wave which is determined from the wheel rotational angles and the radial displacement of the portion with the contour of a true circle of the upper spindle are calculated to be formed;
a second step where each of the first wave and the second wave is developed into a Fourier series so that a first harmonic of the first wave and the second wave is obtained using the program stored in the read only memory and read out to the central processor unit for calculation;
a third step where the first harmonic is subtracted from the third wave to form an amendment wave comprising a locus which the center of the nut seat pitch circle draws relative to a hub hole center during rotation of the wheel to be measured;
a fourth step where the first harmonic is subtracted from each of the first and second waves, and then the remaining harmonics of the first wave are again synthesized so that a wave of radial displacements of the rim wall from a true circle having a center at the hub hole center is obtained, and the remaining harmonics of the second wave are again synthesized so that a wave of axial displacements of the rim wall from a true circle having its center at the hub hole center is obtained; and
a fifth step where the amendment wave is subtracted from each of the radial and axial displacement waves having their centers at the hub hole center so that radial displacements and axial displacements of the rim wall from a true circle having its center at the center of the nut seat pitch circle are obtained, and whether or not the obtained radial and axial displacements are allowable is determined.

8. The apparatus according to claim 1 further comprising a nut seat position detecting device disposed on one side of the upper head, the nut seat detecting device extending toward the nut seat pitch circle of the wheel to be measured and detecting positions of the nut seat during rotation of the wheel by means of a laser.

* * * * *